United States Patent [19]
Capps, Jr. et al.

[11] Patent Number: 5,864,664
[45] Date of Patent: Jan. 26, 1999

[54] APPARATUS AND METHOD FOR PROTECTING SYSTEM SERIAL NUMBER WHILE ALLOWING MOTHERBOARD REPLACEMENT

[75] Inventors: Louis Bennie Capps, Jr., Round Rock; Richard Nicholas Iachetta, Jr., Pflugerville; Darryl Edmond Judice, Austin, all of Tex.

[73] Assignee: International Business Machines Corporation, Armonk, N.Y.

[21] Appl. No.: 706,158

[22] Filed: Aug. 30, 1996

[51] Int. Cl.⁶ ................................................ G06F 11/00
[52] U.S. Cl. .................................................. 395/186
[58] Field of Search ............................... 395/186, 187.01, 395/188.01, 490, 491, 609, 282, 283; 380/3, 4, 23, 25; 364/464.15

[56] References Cited

U.S. PATENT DOCUMENTS

| | | | |
|---|---|---|---|
| 4,424,573 | 1/1984 | Eckert, Jr. et al. | 364/900 |
| 4,506,329 | 3/1985 | Duwel et al. | 364/464 |
| 4,525,786 | 7/1985 | Crowley et al. | 364/466 |
| 4,748,561 | 5/1988 | Brown | 395/491 |
| 4,783,745 | 11/1988 | Brookner et al. | 364/464.02 |
| 5,214,699 | 5/1993 | Monroe et al. | 380/23 |
| 5,222,134 | 6/1993 | Waite et al. | 380/4 |
| 5,375,243 | 12/1994 | Parzych et al. | 395/188.01 |
| 5,434,870 | 7/1995 | Benton et al. | 371/37.1 |
| 5,495,531 | 2/1996 | Smiedt | 380/4 |
| 5,513,169 | 4/1996 | Fite et al. | 369/272 |

*Primary Examiner*—Robert W. Beausoliel, Jr.
*Assistant Examiner*—Scott T. Baderman
*Attorney, Agent, or Firm*—Volel Emile

[57] ABSTRACT

The present invention provides a method and apparatus for changing the serial number of a replacement motherboard to that of a malfunctioning motherboard thus ensuring that application software are able to be executed on the workstation without interruption while providing assurances to software vendors that the workstation is permitted to run the application software. In an embodiment of the invention, an uninitialized serial number is stored in memory of the replacement motherboard at manufacture time. Once the replacement board is used to replace a malfunctioning motherboard, the uninitialized serial number is initialized by being replaced with the serial number of the malfunctioning motherboard. After initialization, no changes are permitted. In another embodiment of the invention, the workstation is forced to be rebooted after initialization. Here, however, changes to the initialized serial number will be allowed so long as the workstation has not been rebooted.

9 Claims, 2 Drawing Sheets

APPARATUS AND METHOD FOR PROTECTING SYSTEM SERIAL NUMBER WHILE ALLOWING MOTHERBOARD REPLACEMENT

BACKGROUND OF THE INVENTION

1. Field of the Invention

The present invention relates generally to a computer system and, more particularly, to a computer system having a motherboard with a serial number permitting executions of licensed software.

2. Description of the Related Art

Each workstation in a system has a unique serial number to identify itself from other workstations. The serial number is usually stored electronically on the workstation's motherboard. This number is often used by an operating system to create a unique name (i.e., UNAME) that is passed to an application software making a UNAME call. The application software uses the UNAME to ascertain whether a software license has been granted permitting the execution of the application software on the workstation.

Conventionally, the serial numbers were stored on workstations' motherboards using two methods. The first method was to store the serial number into a secure device such as an electronically erasable programmable read-only memory (EEPROM) located on the motherboard at manufacture time. This number was unchangeable since the serial number could only be read from the EEPROM. This, therefore, provided a level of security to software vendors knowing that only workstations with the proper permission were able to run the application software.

Typically, when a workstation's motherboard malfunctioned, it was replaced by a new motherboard which ordinarily had a different serial number. Using the new serial number, the operating system, then, created a UNAME which was different from the one expected by the application software. Accordingly, in order for the workstation to run the application software a new license had to be provided. This entailed contacting the software vendor and requesting the new license. This exercise usually translated into a loss of use of the software for a period of time which, often times, contributed to a loss of productivity.

The second method was to store the serial number in a lockable region in a non-volatile random access memory (NVRAM) or some similar technology on the motherboard. System firmware would lock the region to make it a read-only region before passing control to the operating system. This method allowed the serial number of a replacement motherboard to be changed to that of the original motherboard by running a utility software before passing control to the operating system. Hence after a motherboard replacement, the operating system continued to create proper UNAME allowing the application software to run on the workstation uninterrupted. However, since the serial number was able to be changed at a user's whims, the software vendors were not assured that proper licenses always existed for the software running on the workstations.

Thus, there is a need in the art for a method that allows serial numbers to be changed in case of motherboard replacements allowing application software to continue to run on workstations without interruption while assuring software vendors that licenses, permitting an application software to run on a workstation, exist.

SUMMARY OF THE INVENTION

The need in the art is addressed by the present invention. The present invention provides a method and apparatus for changing the serial number of a replacement motherboard to that of a malfunctioning motherboard thus ensuring that application software are able to be executed on the workstation without interruption while providing assurances to software vendors that workstations are licensed to run the application software. In an embodiment of the invention, an uninitialized serial number is stored in memory of the replacement motherboard at manufacture time. Once the replacement board is used to replace a malfunctioning motherboard, the uninitialized serial number is initialized by being replaced with the serial number of the malfunctioning motherboard. After initialization, no changes are permitted.

In another embodiment of the invention, the workstation is forced to be rebooted after initialization. Here, however, changes to the initialized serial number will be allowed so long as the workstation has not been rebooted.

DESCRIPTION OF THE INVENTION

Figure 1:
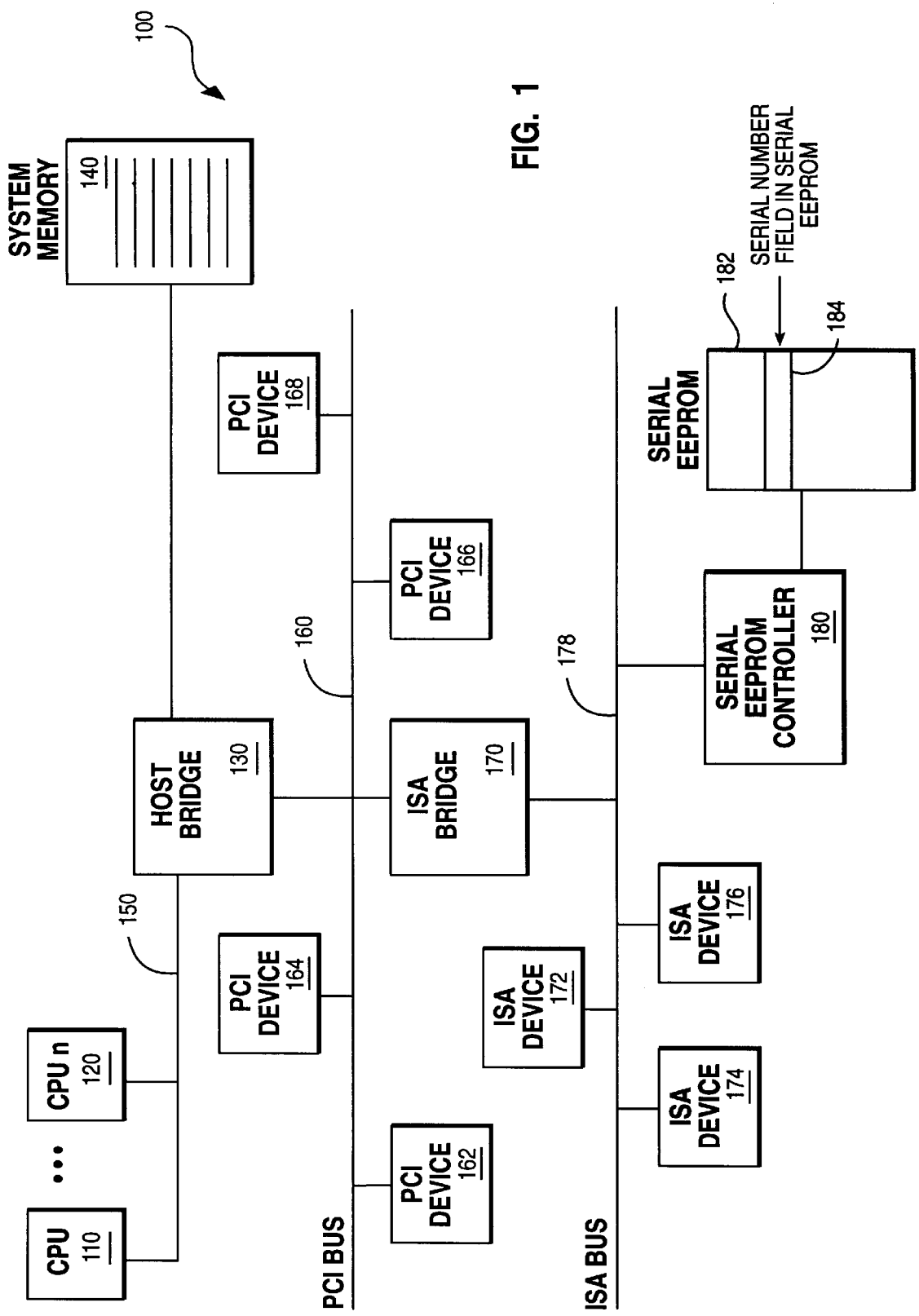
FIG. 1 is a block diagram of a motherboard of a computer system employed in a preferred embodiment of the invention.

FIG. 1 is a block diagram of a motherboard 100 of a computer system employed in a preferred embodiment of the invention. Such computer may take the form of a workstation such as the RS/6000 systems marketed by the IBM Corporation, although the invention is not intended to be so limited and is equally applicable to essentially any computer system.

Still referring to FIG. 1, the motherboard 100 contains a plurality of central processing units (CPU) 110 and 120 connected to a system memory 140 through a host bridge 130 on system bus 150. The host bridge is connected to a peripheral component interconnect (PCI) bus 160 having PCI devices 162–168 attached thereto. Also attached to the PCI bus 160 is an industry standard architecture (ISA) bridge 170 which is connected to an ISA bus 178. The ISA bus 178 has devices 172–176 as well as a serial EEPROM controller 180 attached to it. Connected to the serial EEPROM controller 180 is a serial EEPROM 182. The serial EEPROM controller 180 supervises communications with the serial EEPROM 182. The PCI devices as well as the ISA devices may comprise any of the following: graphics adapters, modems, keyboards, compact disk, floppy disk, hard disk drives etc. As is well known in the art, the local bus 150, the PCI bus 160 and the ISA bus 178 use different protocols. The devices attached to a particular bus can communicate to devices on another bus using the appropriate bridge which acts as a translator. For example, the CPU 110 attached to the local bus 150 may access data in the serial EEPROM by going through the host bridge 130 and the ISA bridge 170.

The invention is implemented in serial EEPROM controller 180. Note that here the word "serial" in serial EEPROM is used to indicate that the contents of the EEPROM are accessed serially (i.e., one bit at a time) and does not refer to serial numbers. As mentioned before, in the past the serial number of the motherboard was encoded into the serial number field 184 of the serial EEPROM 182 at manufacture time. Hence, each motherboard had its own unique serial number. Consequently, when an operating system used the serial number of a replacement motherboard, it created a UNAME different than that expected by the application software. This prevented the execution of the application software on the workstation.

In the present implementation, a number having a header indicating an uninitialized serial number is encoded into the serial number field 184 of the serial EEPROM 182 at manufacture time. The header may be designated by an 'A55A' string in the first two bytes of the 16-byte serial number. At time of assembly, the serial number of the workstation is encoded, via software, into the serial number field 184 of the serial EEPROM 182, thus initializing the serial number. Once the serial number is initialized, the EEPROM controller 180 does not allow the serial number to be changed. If the motherboard malfunctions, it can be replaced by a motherboard having an uninitialized serial number. Upon reading the uninitialized serial number, the EEPROM controller 180 will allow the number in the serial number field 184 to be changed. In this case, the uninitialized serial number can be changed to the serial number of the previous motherboard allowing the application software to continue to create the proper UNAME. Hence, executions of application software on the workstation will go uninterrupted. In addition, since once initialized the EEPROM controller does not allow the serial number to be altered, the software vendors are assured that proper licenses exist for each application software executed on the workstation.

Uninitialized numbers may be inadvertently initialized to a wrong serial number. Thus, a procedure may be put in place wherein the EEPROM controller may allow an unlimited number of changes to the serial number until the workstation is power cycled or rebooted. This can be implemented by using a service utility software to prompt the user, in this case a technician, to ascertain whether the serial number entered is correct. If the number is incorrect, the technician may reenter the number. After each entry, the service utility will request that the technician check the number entered. The service utility software will continually request that the technician check the number until the workstation is powered down or rebooted. When the workstation is powered back up or has been rebooted, no changes to the serial number will be allowed using the service utility software. The serial number may, nevertheless, be changed at a service repair facility using the same equipment that originally set the factory installed serial number.

Figure 2:
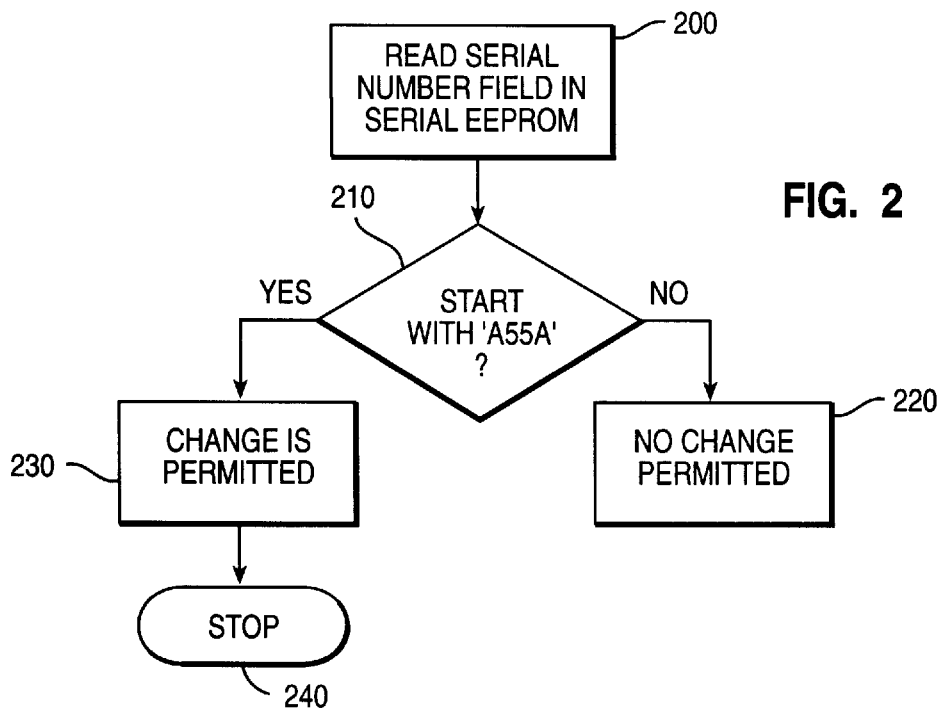
FIG. 2 is a flow chart depicting the algorithm executed by a serial EEPROM controller each time power is applied to the motherboard.

FIG. 2 is a flow chart depicting the algorithm executed by the serial EEPROM controller each time power is applied to the motherboard. In step 200, the serial number in the serial number field of the serial EEPROM is read by the serial EEPROM controller 180. In step 210, it is determined whether the serial number read starts with the string 'A55A'. If the serial number does not start with the 'A55A' string, the serial number has been initialized and thus no changes to the serial number will be allowed (step 220). If the number does start with the string 'A55A', the serial number has not been initialized and changes are allowed (step 230). The process stops at step 240. Note that no serial numbers that begin with 'A55A' should be assigned to workstations or systems.

Figure 3:
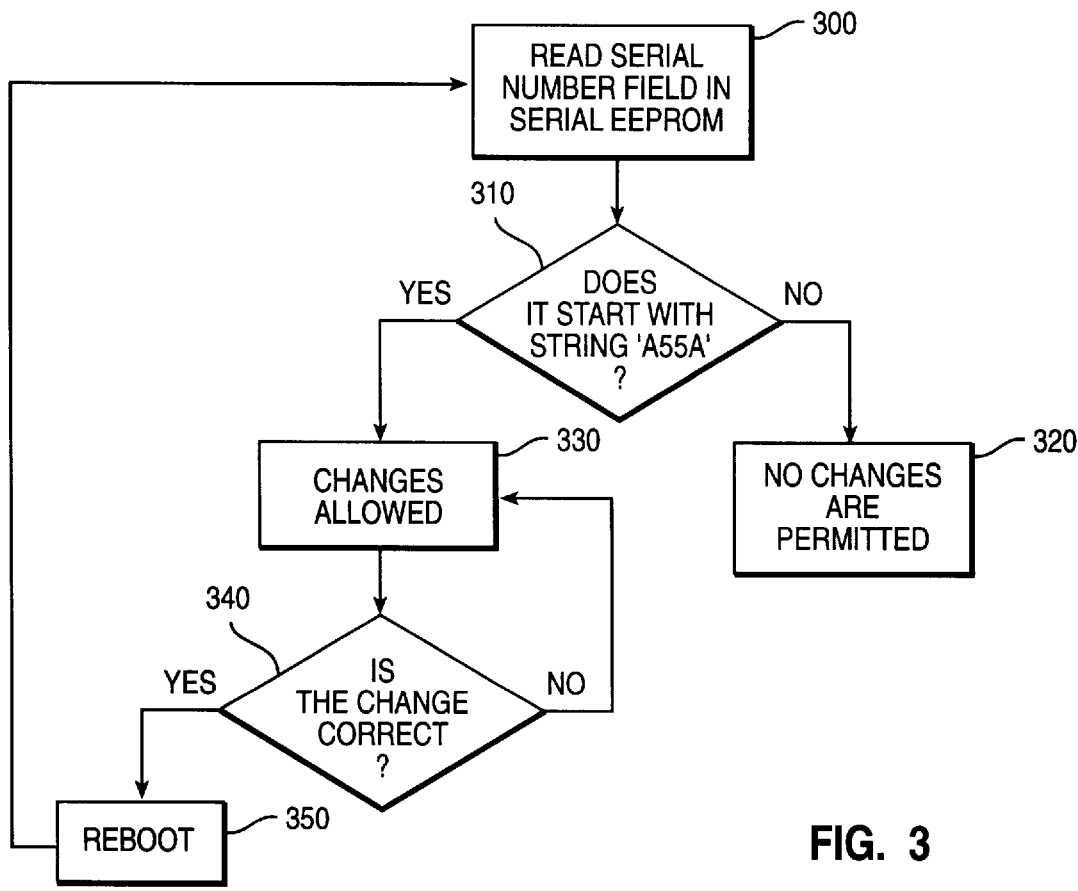
FIG. 3 is a flow chart depicting the algorithm executed by the serial EEPROM controller in conjunction with a software utility to ascertain whether a correct serial number is entered.

FIG. 3 is a flow chart depicting the algorithm executed by the serial EEPROM controller in conjunction with a software utility in case the wrong serial number is entered. In step 300, the serial number in the serial number field of the serial EEPROM is read by the serial EEPROM controller 180. In step 310, it is determined whether the serial number read starts with the string 'A55A'. If the serial number does not start with the 'A55A' string, the serial number has been initialized and thus no changes to the serial number will be allowed (step 320). If the number does start with the string 'A55A', the serial number has not been initialized and changes are allowed (step 330). After entering the serial number, it is determined whether the serial number entered is correct in step 340. If it is not correct then the serial number is allowed to be changed by returning to step 330. If the change is correct then the system needs to be rebooted (step 350). Once rebooted the process will return to step 300 and the serial EEPROM controller will again read the serial number. This time the serial number will not start with the string 'A55A' and no changes will be permitted.

Although the present invention has been fully described above with reference to specific embodiments, other alternative embodiments will be apparent to those of ordinary skill in the art. For example, the serial number may be stored in any NVRAM that does not require power to maintain its contents. In addition, the serial EEPROM may be attached to any one of the buses of the system without deviating from the present description. Therefore, the above description should not be taken as limiting the scope of the present invention defined by the appended claims.

What is claimed is:

1. An apparatus for storing a serial number into a memory of a motherboard, said serial number allowing a computer system having said motherboard to execute application software, said apparatus comprising:

means for storing an uninitialized serial number in said memory, said uninitialized serial number having a header for allowing said serial number to be replaced;

means for initializing said uninitialized serial number by replacing said uninitialized serial number with said serial number allowing said computer system to execute said software application, said serial number being allowed to be changed multiple times so long as the computer system is not rebooted; and means for inhibiting replacement of said initialized serial number once the computer system has been rebooted.

2. The apparatus of claim 1 wherein said computer system becomes operational after said uninitialized serial number is initialized if it is rebooted.

3. The apparatus of claim 1 wherein said memory is an EEPROM and said inhibiting means is an EEPROM controller.

4. A method of storing a serial number into a memory of a motherboard, said serial number allowing a computer system having said motherboard to execute application software, said method comprising the steps of:

storing an uninitialized serial number in said memory, said uninitialized serial number having a header for allowing said serial number to be replaced;

initializing said uninitialized serial number by replacing said uninitialized serial number with said serial number allowing said computer system to execute said software application, said serial number being allowed to be changed multiple times so long as the computer system is not rebooted; and inhibiting replacement of said initialized serial number once the computer system has been rebooted.

5. The method of claim 4 wherein said computer system becomes operational after said uninitialized serial number is initialized if it is rebooted.

6. The method of claim 5 wherein said memory is an EEPROM and said step of inhibiting includes using an EEPROM controller.

7. A computer program product stored in memory executable by a processor for storing a serial number into a memory of a motherboard, said serial number allowing a computer system having said motherboard to execute application software, said computer program product comprising:

computer readable program code means for storing an uninitialized serial number in said memory of said motherboard, said uninitialized serial number having a header for allowing said serial number to be replaced;

computer readable program code means for initializing said uninitialized serial number by replacing said uninitialized serial number with said serial number allowing said computer system to execute said software application, said serial number being allowed to be changed multiple times so long as the computer system is not rebooted; and computer readable program code means for inhibiting replacement of said initialized serial number once the computer system has been rebooted.

8. The computer program product of claim 7 wherein said computer system becomes operational after said uninitialized serial number is initialized if it is rebooted.

9. The computer program product of claim 8 wherein said memory of said motherboard is an EEPROM and said inhibiting means is an EEPROM controller.

* * * * *